Figure 1:
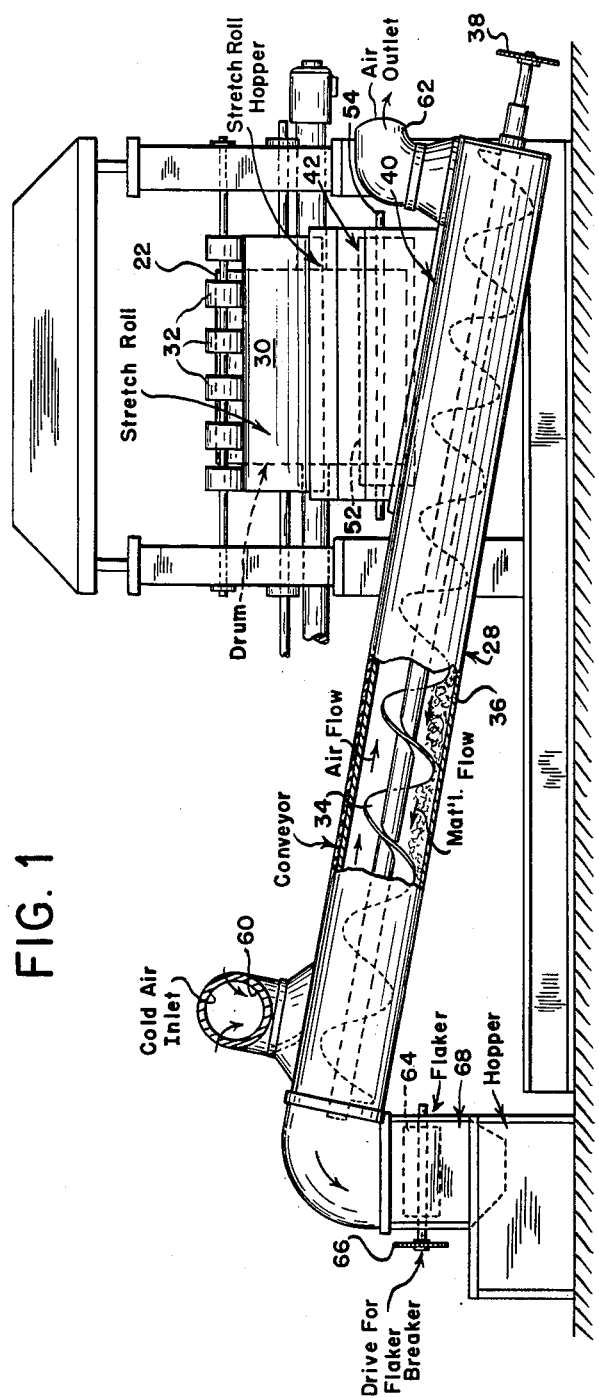

Nov. 21, 1961  G. J. LORANT ET AL  3,009,815
DEHYDRATION OF PUREES

Filed May 20, 1959  5 Sheets-Sheet 3

INVENTORS
George J. Lorant
Murray L. Rollins
Donald C. Guterman
BY
ATTORNEYS

Nov. 21, 1961  G. J. LORANT ET AL  3,009,815
DEHYDRATION OF PUREES
Filed May 20, 1959  5 Sheets-Sheet 4
INVENTORS
GEORGE J. LORANT
MURRAY L. ROLLINS
DONALD C. GUTERMAN
BY Frederick F. Mack and
Michael J. Quillinan
ATTORNEYS Nov. 21, 1961   G. J. LORANT ET AL   3,009,815
DEHYDRATION OF PUREES
Filed May 20, 1959   5 Sheets-Sheet 5
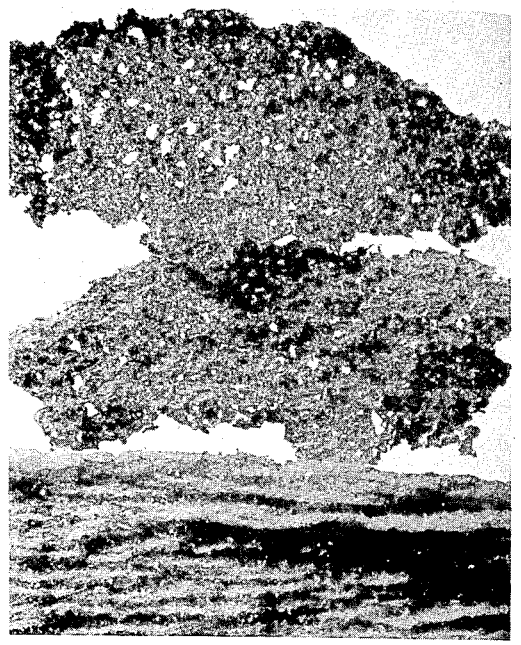
Ciii
Cii
Ci
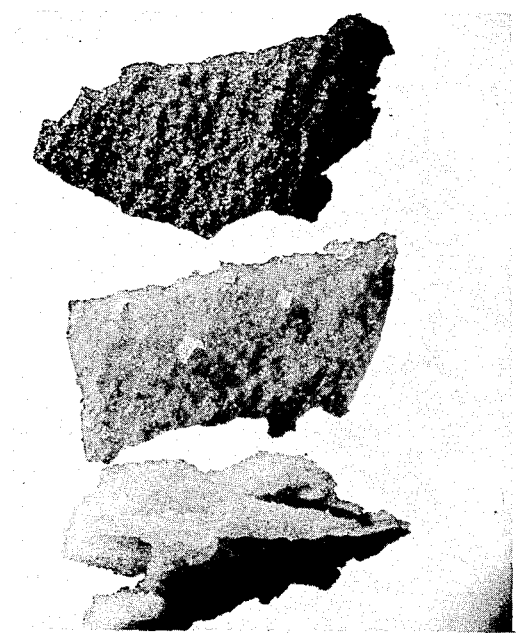
Diii
Dii
Di
INVENTORS
GEORGE J. LORANT
MURRAY L. ROLLINS
DONALD C. GUTERMAN
BY Frederick F. Mack and
Michael J. Quillinan
ATTORNEYS

United States Patent Office 3,009,815
Patented Nov. 21, 1961

3,009,815
DEHYDRATION OF PUREES
George J. Lorant, Murray L. Rollins, and Donald C. Guterman, Albion, N.Y., assignors to General Foods Corporation, White Plains, N.Y., a corporation of Delaware
Filed May 20, 1959, Ser. No. 814,424
22 Claims. (Cl. 99—204)

This invention relates to pureed food products suitable for feeding infants and adults requiring geriatric or postoperative care and generally useful in the preparation of soups, desserts and other food preparations. More particularly, the invention is concerned with the manufacture of strained food products which have a relatively high percentage of natural or added sugars and/or pectinous substances; are readily rehydratable in cold tap water, milk or other aqueous liquids; and when frozen in a relatively dehydrated condition are free from agglomeration whereby a free-flowing readily handled product is obtained.

In the art of preparing so-called dehydro-frozen fruits such as pears, peaches, apples, apricots, tomatoes, cranberries, and the like, in the form of a puree it is desirable that the product have the ability to rehydrate "instantly" and completely; in this connection the term "instantly" is used to describe a product capable of rehydrating in about 30 seconds and ranging anywhere from a period of a few seconds to one minute, which hydration can take place in cold, lukewarm, warm or boiling water or other aqueous liquid and is accompanied by a rapid increase in viscosity.

Heretofore, in recognition of the economies offered in terms of reduced package weight and volume, proposals have been made for processes to reduce the moisture content of fruits by dehydro-freezing them. Most dehydro-freezing practices involve a relatively slow drying operation, during which operation, certain factors are operative to impair the desired rehydration characteristics of the product. Typical of such slow dehydration procedures are processes employing so-called tunnel or truck dehydrators which have been used for many years to dehydrate vegetables and fruits. For the drying of fruit purees a more rapid and economical method of drying would be the procedure of passing a slurry of puree over a revolving drum, the outer surface of which is heated and offers a drying interface having good heat transfer and particle release properties capable of increasing the solids content of the puree from say 9–30% down to about 98–90% solids but not above that solids level where flavor, color and nutrition suffer.

In carrying out such a drum drying operation a number of difficulties are encountered which tend to impair the rehydration characteristics of the dried product. The partially dehydrated film of product is plastic at the point of removal from the drum by such means as a doctor blade tangentially engaging the smooth surface of the drum. Because of this there is a build-up of product on the doctor blades such that as the product is pushed away from the drum it assumes a wavy irregular surface of somewhat crepe-like appearance due to the deceleration of the film as it leaves the dryer. Build-up of this thickness of product is adverse to rapid rehydration of the doctored product.

Heretofore prior art drum drying practices have been concerned with the problems involved in protecting product doctored from a drum dryer against overheating. Thus, in conventional prior art techniques it has been suggested that a blast of cold air be directed at the doctoring or scraping point or that the continuous film of product doctored from the drying surface be rapidly separated from the vicinity of the drying surface and stretched in which latter practice a cooling zone was also employed to extract residual heat from the film as soon as it is drawn away from the doctor blade or while it is being stretched. However, such prior art practices fail to contemplate the need for endowing the continuous film thus dehydrated with significantly improved rehydration or reconstitution properties. In addition, it has been proposed to remove the web or film under tension to induce further stretching by use of frictional pull exerted by a portion of the periphery of a single take away roll.

Such prior art is only concerned with maintaining a substantially continuous unbroken web or film consistent with good uninterrupted manufacturing practice such that a minimum of down-time will arise from film breakage; films of such products do not rehydrate or reconstitute instantly as the term is understood and referred to herein.

In accordance with the present invention an improvement in the art of drying a puree, puddings, and similar products having a relatively high proportion of natural or added sugars and/or pectinous substances initially present, added or liberated in cooking is achieved in a manner which meets the foregoing need for an instantly rehydratable product in film or flaked form; for ease of reference the products processed in accordance with this invention will be referred to hereinafter as "purees," but will be understood to encompass soup stocks, slurries and solutions containing solid particles, all of which compositions tend to form continuous stretchable films rather than a powder upon removal in a concentrated form from a drying surface. The improvement comprises applying a puree having finely divided food solids at a level usually in the order of 9–30% (but sometimes higher) to a smooth surface whereon the puree is heated, concentrated and converted into a continuous film having a syrupy viscous elastic condition while in the heated state; in this condition the finely divided food solids are suspended in a molten liquefied sugar and/or pectin-like sacchariferous molten carrier which supplies to the film a tensile strength varying from product-to-product, but in any event sufficient to permit the product to retain a continuous cohesive nature after it is stripped from the heating surface and while it is stretched to the extent specified herein. Stripping is preferably facilitated by such means as a doctor blade. Usually, the moisture content of the stripped film will be less than 12% and higher than 2% by weight of the film. The film is continuously stripped in its molten condition.

Upon stripping, the film is subjected to tension substantially in excess of that required to prevent agglomeration at the doctor blade and below that tension at which the film will fail completely which failure would become evidenced by a continuous breaking or fracture resulting in interruption of the continuity of the film. The tension should be sufficient to stretch and thereby elongate the film whereby food solids are thinly and discretely dispersed in the still molten sacchariferous carrier therefor and whereby fibrous and other insoluble food solids contained in the film appear randomly arranged and unoriented to the unaided eye. Films of peach and pear purees, and to a lesser degree apple and tomato purees, will have a greater tensile strength than pudding films due to the higher proportion of pectinous materials in the fruits. Consequently, such fruit purees will generally call for a higher amount of applied tension than puddings; in this connection, the temperature of the stripped film will contribute to its stretchability and although a rapid cooling of the film being stretched is desired it should be sufficiently molten, at least in the initial stages of elongation, to create the stretched condition herein specified; however, the product temperature generally will not exceed 212° F. while it is being stretched. Usually, this stretched condition will be evidenced by a random distribution of discontinuous openings, surface failures and void spaces throughout the stretched film and will also be evidenced in many natural fruit purees by minute blisters or puffs barely visible to the unaided eye, giving rise in many cases to a plurality of pustules some of which are broken and some of which are substantially intact.

Under a high powered microscope the stretched cooled product can be seen to comprise a translucent base layer or phase which is continuous and holds dispersed solids or agglomerates with the surface of the product also being translucent, the aforesaid discontinuous openings, surface failures, and void spaces in the product occurring in the continuous phase indicating a loss of elasticity at spaced points of the sacchariferous carrier for the food solids.

The thickness of the film of product after stretching will vary from product-to-product in accordance with the stretchability of the product and the degree of stretching required to render it instantly rehydratable. Usually the stripped film will be reduced to a thickness less than 0.050 inch and ranging anywhere from 0.005 inch upward.

Hence, the tension employed in accordance with the present invention for removal of the film from the heating surface is well in excess of that normally required to prevent agglomeration of the product and rapid removal of the film from the drying surface.

Stretching can be carried out by any positive controllable means for accelerating the rate of travel of the stripped film relative to the rate of film travel at the point of stripping. Because of the desired film characteristic such stretching means should be capable of creating such a rate increase uniformly without inducing excessive tension while assuring the creation of sufficient tension to establish and maintain a high degree of dispersion of food solids throughout the molten carrier therefor.

By virtue of the condition of the film created by stretching, there is an ideal distribution of the water soluble and water insoluble food solids therein with the film displaying attractive colors and offering fresh flavors upon reconstitution. Most of the water soluble food solids appear to be in the continuous phase, with most of the water insoluble solids being thinly and discretely dispersed therein as a discontinuous phase. A substantial majority of the surface of this thin film is also comprised of said continuous phase. By virtue of this arrangement and condition of water soluble and water insoluble food solids, though the water soluble solids will go into solution quickly in cold water, this does not occur at the expense of the water insoluble solids which are ideally dispersed and have the greatest opportunity to rehydrate without clumping.

Flakes produced by breaking the film will have been broken into various sizes depending upon the rehydration characteristics of the particular puree being dried. For most fruit purees and puddings the film will preferably be flaked into a particle size whereat 100% of the product passes a 10 mesh U.S. Sieve Series screen (0.030" wire), although even larger size flakes may be produced with acceptable rehydration properties. In general, the film without further treatment according to our process, should not be broken up to a very fine particle size, viz., below a 40 mesh U.S. Sieve Series screen (0.010" wire), since in breaking up the film the particles tend to lump during handling or storage into a candy-like ball which will not hydrate instantly in cold water.

The importance of the foregoing stretching will be appreciated when it is considered that in the case of a plastic and yet stretchable film of puree which is not stretched to the extent and in the manner contemplated herein and from which sensible heat is allowed to dissipate, a flaked puree will have relatively poor rehydration characteristics; e.g., 3–10 minutes will be required, when the product is reconstituted in cold or luke warm water (40°–80° F.), before the desired smooth, even texture and viscosity is obtained. In the case of the aforesaid stretched film and the flake product of the present invention, the puree product has rehydration characteristics which can be appropriately termed "instantaneous" and which broadly speaking has the ability to reconstitute to the desired viscosity in cold to luke warm water (40°–80° F.) in less than 60 seconds depending upon the product, usually 1–30 seconds. Apple purees are the fastest in rehydration, this phenomenal rehydration being manifest in the form of a "blossoming" of the product upon reconstitution in water. In the case of pears a slight delay in the order of say 5 seconds is observed before such blossoming occurs. In any event, the foregoing rehydration characteristics prevail in a wide variety of fruits, and the term "fruit" as it is employed in the accompanying claims is intended to cover any plant having a high natural sugar content, say in the order of 13% by weight of solids, and represented by such common fruits as apples, cranberries, peaches, pears, apricots and the like.

The term "stretchable" as it is employed in the foregoing statement and in the accompanying claims is intended to describe that plastic condition which prevails when the puree has been reduced to a moisture content generally in the neighborhood of more than 90% solids and ranging anywhere between 90–98% solids, the upper range of moisture content being limited by the characteristics of the plastic state as well as the characteristics of the product itself which at an unduly high solids content can be deteriorated by excessive heat treatment; in general, it has been observed that moisture between 2–10% in the stretchable mass is desirable but still higher moisture content in the order of 15% can also be practiced while carrying out the present invention; for natural fruit purees not having additives therein a moisture content in excess of 10% will be characterized as soupy; however, modifying thickening agents such as starches, gums, dextrines and the like, detailed hereinafter and capable of increasing the tensile strength of the puree, will of course alter the moisture content at which this desired stretchability will be found to prevail.

A very good rule to observe in determining the degree of stretching which should be practiced is that the product should be stretched to the extent that a plurality of minute surface ruptures appear on the film surface.

Stretching is achieved preferably by causing the hydrous film of product to travel in a substantially uncompressed fashion over take-up means operating to cause the film of material to travel at a rate greater than that at which it is removed from the heated film-forming surface.

To effect proper film flaking, control of product moisture and/or temperature is essential, depending to a great extent on the nature of the material being treated. The product should be in a friable, crisp condition and should remain in this condition after flaking to preserve its free-flowing "instantly" rehydratable character. This friable condition is induced and maintained by subjecting the stretched concentrated curtain of product to controlled atmospheric temperatures and humidities.

Products passing from the stretching means under varying operating conditions may or may not have been cooled to a temperature and adjusted to a moisture content whereat the curtain of solids can be readily flaked under normal atmospheric conditions to yield instantly rehydratable material. Under conditions of high relative humidity certain products, typically many of the fruit purees mentioned above and puddings, will absorb atmospheric moisture due to their hygroscopic character. Other products such as applesauce and tomato paste, even under ideal atmospheric conditions, i.e., low wet bulb temperatures, will require further downward adjustment of product moisture content. Even when a curtain of product has been dehydrated to a point where it will flake properly, i.e., will not ball-up in handling by a conveyor, there will be situations calling for reduction of temperatures also, even though substantial temperature reduction takes place in the course of stretching the product.

To illustrate, applesauce puree will be stripped from the dryer at 7% moisture and in a stretched cool condition at about 5% moisture can be flaked. Nevertheless, under atmospheric conditions of high relative humidity and temperature, the same product removed from a drying roll at a much lower moisture than 7% and having when stretched an even lower moisture content than 5% will not flake effectively and retain its free-flowing and rehydratable properties after storage unless the curtain of product is subjected to a dehumidified air and preferably refrigerated dehumidified air. Overt dehumidification and chilling will for the most part be called for at relative humidities above about 60% and temperatures above 80° F.

Broadly the film of product to be stretched will have a moisture content ranging between 2–7% before stretching (generally about 4.5%) and a moisture content ranging between 5–3% after stretching (generally below 4.5%). It is preferred where products contain a high percentage of sugars, starches and acids to chill the curtain of product by use of recirculated cooled air at a temperature below 70° F. and at a relative humidity below 45%, although as noted above some acceptable products can be obtained when employing slightly higher relative humidities and air temperatures. Where the products being processed are fruit purees and puddings, unchilled flakes thereof stored in a room having an air temperature, say in the order of 7°–10° F. tend to become lumpy and unworkable in a span of about 24 hours. Thus, it is a very distinct advantage and necessary for most fruit purees to employ conditions under which the product has a temperature well below 70° F. as it is introduced to a flaker and well below 80° F. as it leaves the flaker since the resulting flaked product will be free-flowing and perfectly workable after being stored under refrigeration, thereby offering foodstuffs which can be stored in bulk and later packaged as the need arises. In accordance with the most preferred chill flaking concept, ordinary refrigeration means using recirculated dehumidified air at less than 30° F. dehumidifies as well as cools the curtain of stretched product to the desired extent prior to flaking. On the other hand, other means may be employed to effect such treatment continuously during flaking and a preferred modification of apparatus to be described hereinafter is a screw conveyor which is enclosed but for a port of entry to the screw, a source of recirculated dehumidified cool air being introduced to the enclosed conveyor countercurrent to the movement of product; in such conveyor means the curtain of product will be somewhat broken but the flaking operation will occur when the product is delivered to a flaker which is also enclosed and is located downstream from the conveyor. The flaker may comprise any suitable well known flaking apparatus capable of breaking a sheet of product and passing it through a screen; such a flaker usually employs a series of driven paddles which force the product through a screen of a U.S. Sieve Series size generally below 40 mesh.

Thereafter the product can be stored in a suitable refrigerated atmosphere or packed directly either in an inert gaseous atmosphere or under normal atmospheric pack. Thus, the product may be packaged in sterile airtight containers such as tin cans in an inert gaseous atmosphere, e.g., nitrogen. However, a far less expensive packaging system which is ideally and peculiarly suited to the stretched flaked purees of the present invention is the packaging and sale of these products in a frozen condition (0° F.) in any conventional frozen food package.

Having described the product and process features of the invention in general terms, it will now be more fully developed by description and photomicrographs of various chill flaked samples and of apparatus for carrying out the invention.

FIGS. A$i$, A$ii$, and A$iii$ are photomicrographs of pear purees which have been unstretched, stretched to a medium extent and stretched to a maximum extent after drying, respectively; FIGS. B$i$, B$ii$ and B$iii$; FIGS. C$i$, C$ii$ and C$iii$; and FIGS. D$i$, D$ii$ and D$iii$ are corresponding photomicropgrahs of other purees, viz., apple-apricot, applesauce, and vanilla puddings, respectively. Thus, photomicrographs designated by ($i$) represent unstretched dehydrated product and photomicrographs designated ($ii$) and ($iii$) represent the medium stretched and maximum stretched dehydrated purees of the present invention.

Figure 2:
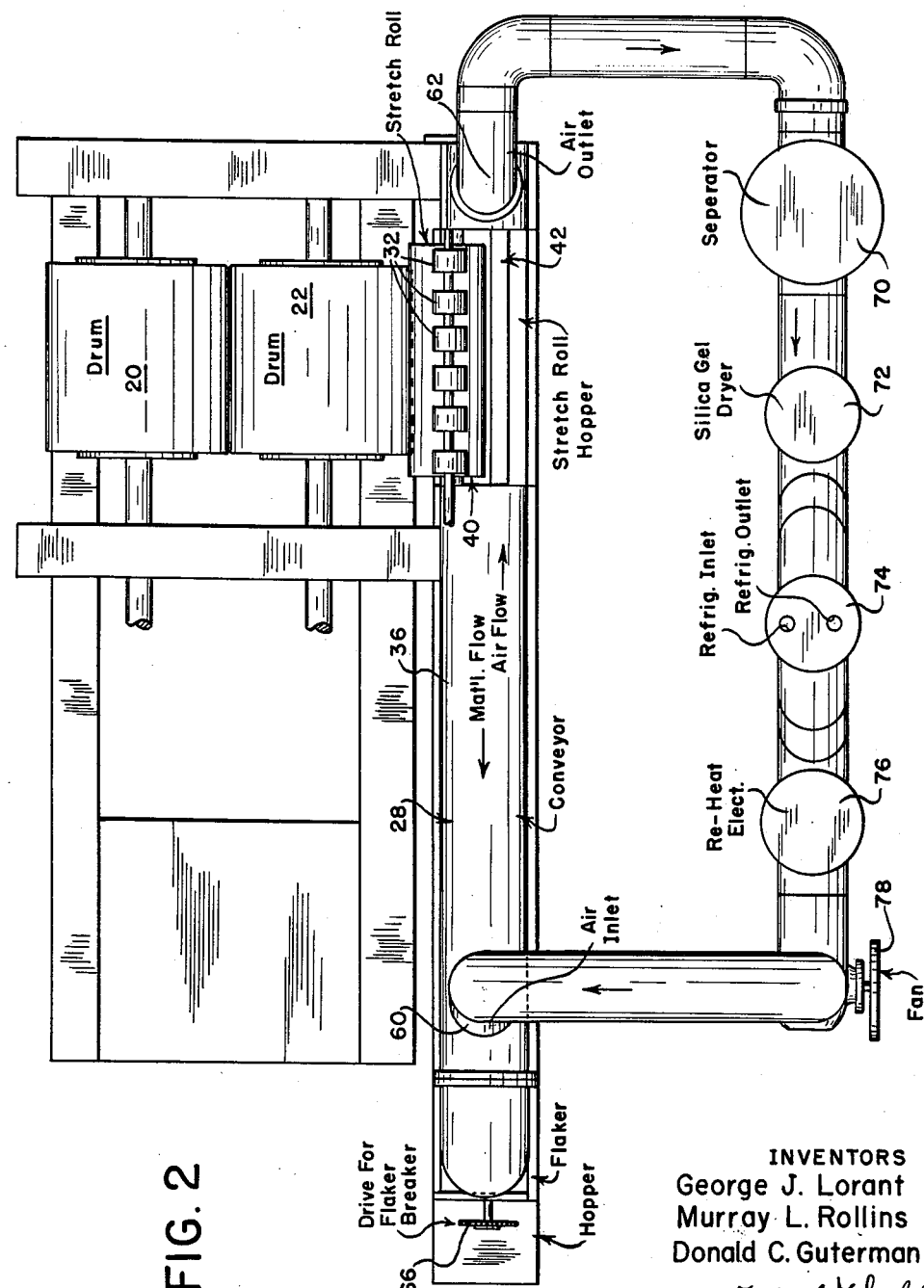
Figure 3:
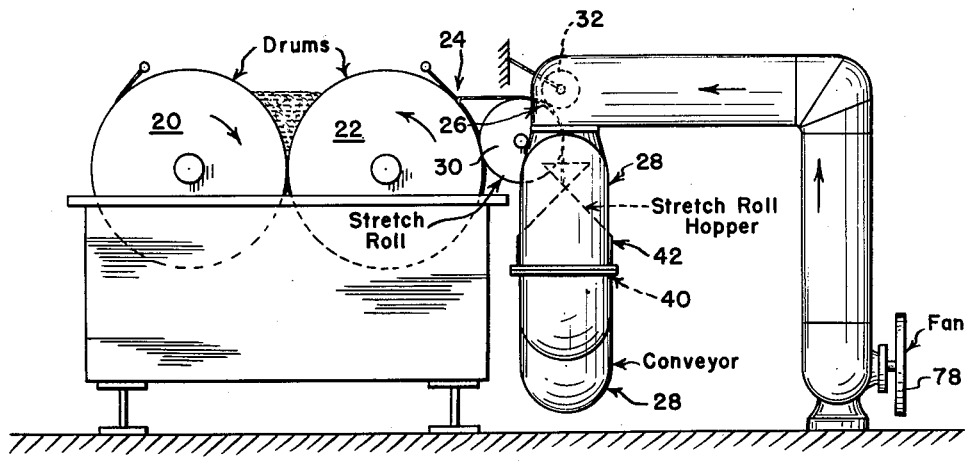
Figure 4:
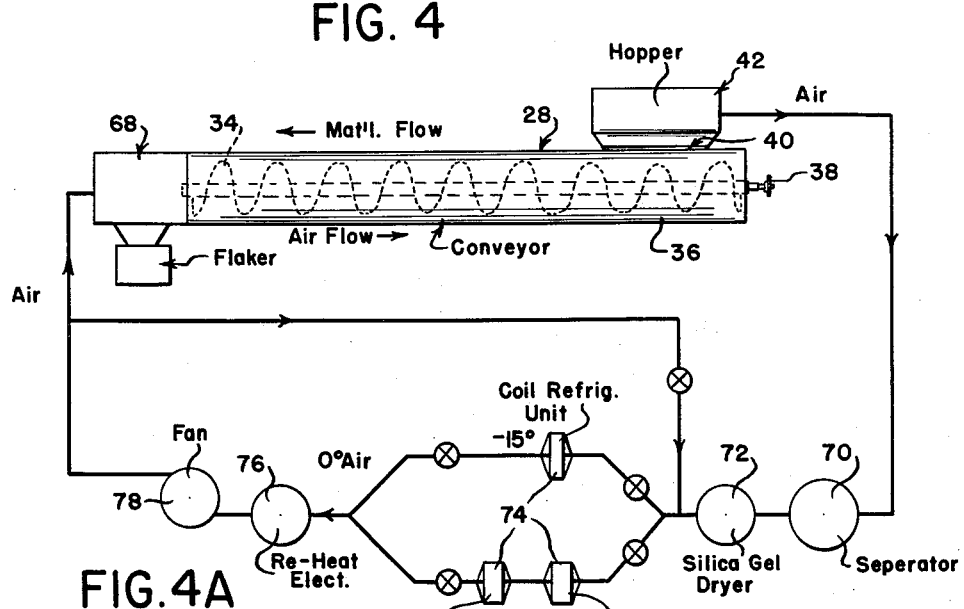
Figure 4A:
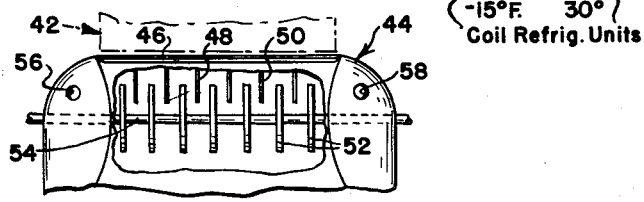

FIG. 1 is a schematic elevation showing apparatus whereby the puree is stretched and the curtain of product is conveyed away and flaked; FIG. 2 is a top plan view of the apparatus in FIG. 1; FIG. 3 is a side elevation view of the apparatus in FIG. 1; FIG. 4 is a schematic plan view of conveying and flaking means showing means for recirculating dehumidified refrigerated air countercurrent to the flow of stretched product to the flaker; and FIG. 4A is an enlarged elevation, with parts cut away, of film breaking means in FIG. 1.

FIGS. A$i$, B$i$, C$i$, and D$i$ show control samples removed from doctor blades of a conventional atmospheric double drum dryer by means of a conventional take-away roll wherein the product is draped loosely over a take-away reel and whereon a curtain of the product is cooled as it is pulled by the friction existing between the product and the surface of the reel; these samples have a generally corrugated crepe-like gross appearance, and when viewed under a high-powered miscroscope at greater than 200 diameters, are seen to comprise thick coalesced agglomerates on the surface of the crepe-like flake arranged in ridges having a generally unilaterally organized direction. These agglomerates are believed to be soluble solids from the cells of the puree in the case of the fruits, i.e., FIGS. A$i$, B$i$, and C$i$. The supporting base structure for these ridges is seen to contain numerous fibres and fibrils, apparently derived from vascular plant fibres and cell walls. In the case of the vanilla pudding (FIG. D$i$) the base layer contains few starch granules having polarizing characteristics similar to those in a raw gelatinized starch; no cellular character or other distinguishing features could be noted.

Referring now to FIGS. A$ii$, B$ii$, C$ii$, and D$ii$, these are medium stretched samples of pears, apple-apricot, applesauce, and vanilla pudding purees which have been stretched or elongated in the manner aforesaid and by apparatus hereinafter described. These "medium stretch" samples, all show distinct thinning of the sample. When viewed under a high-powered microscope surface agglomerates are spread apart in distinct clumps setting on a base layer which is translucent and in the case of fruit purees contains numerous fibres and fibrils apparently from plant vascular remnants and cell walls; these fibres and cell remains indicate the effects of severe distortion and rupturing due to mechanical treatment. As seen in the photomicrographs, the base layer beings to show signs of tearing and some open areas indicate that rendering action has taken place; under a high powered microscope a blistering effect caused either by production of gases or liquids or both under conditions which cause expansion of the product as it is being stretched in the fashion of a bubble bursting is observed; the increases in surface areas between the products series of ($i$) and the medium stretch samples of series ($ii$) are quite great and highly significant in the provision of instantly rehydratable or reconstitutable purees. Referring to the photomicrographs in series (*iii*) the maximum stretch samples of puree show in a more pronounced manner the effects found in the medium stretch samples, it being understood that the more preferred stretched puree of the present invention is the maximum stretch portrayed, although for some products, depending upon the raw material and composition of the overall puree, a medium stretch sample will be acceptable; e.g., applesauce as distinguished from pears and peaches which call for a higher degree of stretching of the type portrayed in series (*iii*). Again, when viewed under a high-powered microscope the base layer or continuous phase is translucent and the cellular remnants appear to be broken and ruptured to a greater extent. As seen in FIGS. A*iii*, B*iii* and C*iii* tears and breaks are great in number and extent. Under a high-powered microscope the agglomerates on the surface of the product appear to be spread further apart and are generally smaller in the case of series (*iii*) than in the case of series (*ii*).

The above description of the products of series (*ii*) and (*iii*) reveals evidence of a tremendous pulling, shearing and tearing action on the substrate with resulting dislodgement of cellular contents to the surface of the supporting base layer, composed of cellular (in the case of fruits) remnants. Although more basic biochemical and biophysical forces have probably been active during the present stretching process which may have contributed to the greater rehydratability of the products of series (*ii*) and (*iii*) over the products of series (*i*), the physical changes noted account at least in part for the improvements in rehydratability obtained, the tremendous increase in surface area and reduction in sheet thickness as well as the displacement into a dispersed discontinuous phase of agglomerates of food solids in a matrix of carbohydrates and other constituents also contributing to an ideally rehydratable structure. Although these agglomerates of food solids may be generally designated as "soluble," these products are more commonly referred to as rehydratable and suspendible materials.

The composition of this continuous phase, of course, depends upon the raw materials from which the puree is made. Thus the puree may be compounded from comminuted fruit solids and fruit juices and mixtures thereof which it is possible to combine with vegetable solids and juices, meat solids, and comminuted vegetable-meat mixtures if desired, most of which in a concentrated condition lend themselves to the stretching technique of the present process.

However, as illustrated by the composition of FIGS. D*i*, D*ii*, and D*iii*, the puree may be composed of other comestibles such as puddings high in starch and sugar levels and possessing a tacky, stretchable, viscous nature; in this latter category of materials various flavored puddings, such as vanilla, chocolate, orange and the like will be most suitable, the starch of such compositions being potato, tapioca, arrowroot, sago, corn, etc., either gelatinized or partially gelatinized. Overall, a substantial fraction of the non-aqueous constituents of the pudding puree will be starchy in nature or origin and will have been gelatinized to a gel-like consistency by reason of the heat treatment the puree undergoes as its solids content is increased on the drum to render the puree film-forming and stretchable.

Typical of those useable thickening materials or "modifiers" which are starchy in nature, but not in origin as the term is commonly understood and which may be employed to render the cencentrated puree stretchable, are polysaccharides and cellulosic ethers, such as pectin, algin, Irish moss extract, gum arabic, gum acacia, alkali metal salts of carboxymethyl cellulose (CMC) and other non-ionic ethers of cellulose, and the ionic ethers of cellulose, such as ethyl cellulose, methyl cellulose, methyl ethyl cellulose, hydroxy propyl methyl cellulose and hydroxy ethyl cellulose. The present process contemplates that puree compositions can also be obtained by blending one or more of the foregoing gelatinous polysaccarides with proteinaceous materials of animal or vegetable origin, preferably isolated in a gellable heat denaturable condition; e.g., alkali or ethanol extracted soy protein, peanut protein, fish protein, and the like.

The greatest utility for the products of the present invention is in goods intended for infant and geriatric feeding where the facility of use and the desirable appearance and flavor as well as the likeness to fresh fruit are pleasing to the palate. Included in the term "fruit" are tomatoes, pears, apples, apricots, peaches, prunes, cranberries and similar fruity materials; mixtures of such fruits will also be found useful and pleasing in taste, e.g., apple-apricot, pear-apple, etc.

Products acceptable as junior foods or soups may also be produced in accordance with the present invention. Thus concentrated soups of tomato, asparagus, pea and the like may be produced from the cooked pureed vegetable. Many of these vegetables will not have an inherent elastic nature such that they would not ordinarily have the stretchable character herein described. However, many of these materials do contain natural pectinous or pectin-like materials, e.g., cooked tomato paste, which are sufficiently elastic in a cencentrated pureed form to be stretched as a film into products having the foregoing characteristics; for those materials which do not possess sufficient inherent elasticity modifiers may be added to the puree prior to its concentration to a viscous state, such that films thereof may be stretched; for example, pectin or algin when added to a pea puree will lend sufficient stretchability to a sheet of product stripped from a drying roll.

Typical of other materials which may be similarly processed are those containing a substantial proportion of fat associated either with meat or dairy products such as milk or butter. In such cases mixtures of starch, vegetables, fruits, and/or meat solids with such fatty constituents will offer a tacky, elastic quality to a concentrate doctored from a suitable drying surface and the concentrate can be elongated to a film of reduced thickness and will cool rapidly. The product resulting from such stretching, for example, a puree composed of carrots, bacon, celery and rice flour will be found to be stretchable under the conditions herein specified and will be found to be instantly reconstitutable.

Purees of the foregoing types will best be concentrated by employing drying equipment which concentrates the product to a solids content whereat the concentrate will adhere to a drying surface having suitable release properties wherefrom a film of concentrate can be doctored and continuously stretched by manual or mechanical means. Typically one or two chrome-coated atmospheric drum dryers associated with doctor blades engaging the concentrate will be used in combination with suitable means for uniformly stretching the film or curtain of product in a controllable manner. Of course, the stretching means are a very important feature of the present process. The design and location thereof will be dependent to some extent upon the type of drying apparatus employed to produce the film processed therethrough. The stretching means should be capable of continuously applying tension to the product issuing or removed from the drying area and should also transfer the product in the form of a thin curtain or film suitable for subsequent handling, which handling will usually involve dehumidification of the stretched film preferably by means of refrigerated air. Preferably the stretching means should only serve to accelerate travel of the film with respect to a portion thereof. In effecting such acceleration and stretching it is desirable to avoid a highly calendered densified condition in the product. Ideally, such stretching means comprise a stretching roll having a frictional surface above which is mounted idler means. Thus, the degree of stretching required calls for means for insuring sheet travel commensurate with the peripheral speed of a tension roll or reel, such action being insured by positive contact against the take-away roll or reel as provided by idler rolls or wheels of such size, number and placement to provide a gentle gripping contact. While such idler means are preferred, other means will doubtless occur to those skilled in the art and indeed the hands of the operator skillfully placed have been found to provide the same stretching effect but, of course, with less continuity of tension. The take-away roll may be suitably equipped to apply suction to the contacting face of the sheet passing thereover thus again insuring a positive travel of product in accordance with the peripheral speed of the roll or reel and incidentally withdrawing both heat and moisture; such a modification would comprise a roll having a plurality of perforations communicating with a vacuum so as to provide means whereby suction is applied at the periphery of the roll only at the arc of contact required to effect the desired tension.

Referring to FIGS. 1–4 a preferred embodiment of the invention employs a pair of oppositely rotating 24″ diameter chrome coated drums 20 and 22, operating at 1.5 r.p.m. and heated internally with steam at 20 p.s.i.g., each drum having 25 sq. ft. of drying surface, the means for doctoring, stretching and flaking being generally shown at 24, 26 and 28, respectively. Such doctoring, stretching and flaking means are shown associated with only one drum, i.e., 22, similar means employed for drum 20 not being shown. As seen in FIG. 3 a puree is delivered by any suitable means known in the art of drum drying, e.g., a pendulum feed to the pinch between drums 20 and 22 where the product is concentrated approximately 35% by weight until it has a solids content above 85%. In general the thickness of the sheet dried as the product passes the pinch between the drum and the periphery thereof will be dependent upon the gap or spacing between the drums, the drum speed, the nature of the puree and the steam pressure in the drums. The operation and adjustment of the apparatus will be described with reference to applesauce which is prepared by cooking, cooling, and straining to provide a puree having a solids concentration in the neighborhood of 17% by weight and fed to the pinch at 80° F.; the drum spacing for applesauce is in the neighborhood of 0.006–0.015″, preferably 0.010″. The stretchable puree concentrate is produced at a rate of 0.62 lb. per sq. ft. of drying surface per hour and is doctored at 24 and passed over a 6″ diameter foraminous stretcher roll 30 formed of woven wire or expanded metal which is not shown, the sheet of product being maintained thereagainst by a plurality of hard rubber rider wheels 32 engaging roll 30 at the point indicated and pivotally mounted on the frame of the machine to grip the curtain of product and cause it to travel with the stretcher roll substantially at the peripheral speed thereof; in this case the roll was driven at about 3.5 r.p.m. and the curtain of product produced was stretched to the extent shown in FIG. Ciii, the product having been stretched from a thickness at th edoctor blade of about 0.040″–0.050″ to about 0.015″–0.020″ thickness.

The curtain of product falls into refrigerated conveyor and flaker means 28. Means 28 comprises an upwardly inclined screw conveyor 34 mounted for rotation within insulated tube 36 and driven by suitable variable speed motor through gear 38 by means not shown. The curtain of stretched product is deposited into tube 36 through a port 40 of a size suitable to receive the curtain of product. Mounted above port 40 is a hopper and breaker assembly 42. Referring to FIG. 4A this hopper and breaker assembly comprises a generally curved hood 44 having elongated slot 46 therein adapted to receive a curtain of product therethrough, guide springs or wires 48 and 50 serving to introduce the sheet in a substantially planar condition to the action of a plurality of breaker arms or fingers 52 integrally mounted on shaft 54 driven and journalled for rotation in hood 44. Recirculated and dehumidified cold air is adapted to flow upwardly within hood 44 and thereby chill product passing through slot 46. The chilled product is broken by rotating arms 52 passing beneath guide springs or wires 48 and 50, bypassing ports 56—58 being provided at the lateral extremities of the hood 44 to permit escape of the cold air which is under pressure from the hood rather than through slot 46 which would otherwise cause difficulty in maintaining feed from the stretcher roll through the slot 46 to guide wires.

Broken product passing through breaker assembly 42 passes entry port 40 into the path of the rotating flights of screw 34 and is delivered upwardly along the inclined tube 36; communicating with the extremities of tube 36 is a cold air inlet port 60 and a cold air outlet port 62 adapted to circulate cold air countercurrent to the flow of product by means schematically shown in FIG. 2. Broken product conveyed past inlet port 60 cascades downwardly from the upper extremity of tube 36 into the path of rotating paddles 64 driven by suitable means not shown through gear 66, the paddle 64 being within a hopper 68 which is a circumferential screen complementary to the path of travel of the free edges of the paddle.

Referring to FIG. 4, the preferred refrigerated air system will be seen to comprise an air separator preferably of the cyclone type 70, a silica gel air dryer 72, a plurality of indirect heat exchange units of the refrigerated coil type 74, an electrical heating unit 76 and a fan 78 adapted to recirculate the refrigerated dehumidified air in a countercurrent path to the material passing from the drum dryer to the flaker. The silica gel dryer is of conventional design and while silica gel is described as the absorbent material any one of a number of absorbent materials are contemplated within the scope of operation of such a dryer. The refrigeration units 74 chill the partially dehumidified air to temperatures below freezing in many instances and in so doing condense remaining moisture which has not been removed by the inorganic absorbent materials in the dryer. Following the removal of moisture in the refrigeration unit the substantially dehumidified air is made subject to reheating in the heater unit designated by 76 wherein by gradual heating and expansion of the volume of air the relative capacity of the air to absorb greater quantities of moisture is greatly increased. The thus dehumidified air which is now not only dry but also hydrophilic by virtue of its partial reheating is recirculated by means of the blower fan 78 through the system in countercurrent contact with the particles of product.

The flaked and refrigerated product produced by the above apparatus will have been dehydrated to a stable moisture content in the neighborhood of 2% and will possess the fresh flavor and color of the fruit from which the puree was derived. By virtue of the novel stretching action employed the continuous film of concentrated product need not be dehydrated or subjected to temperatures whereat such flavor and color values will be lost in storage. The flaked product when stored at 0° F. will retain its instant rehydration characteristics for a long period of time despite the presence of a substantial proportion of sugars and the otherwise hygroscopic nature of the puree which would cause it to cake on storage. Thus, although for many products it will be desirable to dry blend powdered sugar with the flaked puree the product may also be compounded with high proportions of sugar, that is higher than the amount naturally present and ranging upwardly to the neighborhood of 30% by weight of the flake.

Although the instant rehydration advantage and the desired flavor and color values will be preserved for most products when they are stored under refrigerated conditions, many products will retain their instant rehydration character and will not suffer an undesirable loss of flavor and color on storage; typical of such a product is tomato puree which need not be stored under refrigeration but yet which will rehydrate rapidly, that is in less than 3 minutes and assume a final viscosity higher than would ordinarily be achieved from tomato purees which are dehydrated by other processes to a stable moisture content. Hence, though the products of the present invention have the greatest utility in the manufacture of refrigerated puree goods, the applicability of the invention and the scope of the accompanying claims are not to be so restricted since other products such as tomato will be endowed with the property of instant rehydration and will store adequately under non-refrigerated conditions.

While the present invention has been described with particular reference to specific examples, it is not to be limited thereby, but reference is to be had to the appended claims for a definition of its scope.

What is claimed is:

1. The method of producing a dehydrated puree having improved rehydration properties which comprises concentrating a puree containing finely divided food solids and sacchariferous material to a stretchable condition at a moisture level not greater than 15%, forming a film of said concentrated puree wherein the insoluble food solids are suspended in a sacchariferous molten carrier, and stretching said film under tension to an extent sufficient to distribute water insoluble food solids randomly, thinly and discretely as a discontinuous phase in a continuous phase of water soluble solids without breaking the continuity of the film.

2. The method of producing a dehydrated puree containing water soluble food solids including sacchariferous material and water insoluble food solids which comprises concentrating said puree to a moisture content to a hot stretchable condition at a moisture level of less than 12%, forming a film of said concentrated puree while it is in said stretchable condition and wherein the water insoluble food solids are suspended in a sacchariferous molten carrier, elongating said film under tension while it is in its molten condition to distribute water insoluble solids randomly, thinly and discretely as a discontinuous phase in a continuous translucent phase of water soluble solids, without breaking the continuity of said film.

3. The method of producing a dehydrated puree containing water soluble food solids including sacchariferous material and water insoluble food solids which comprises concentrating said puree to a hot stretchable condition at a moisture content of less than 12%, forming a film of said concentrated puree while it is in said stretchable condition and wherein the insoluble food solids are suspended in a sacchariferous molten carrier, and elongating said film under tension while it is in its molten condition to distribute water insoluble solids randomly, thinly and discretely as a discontinuous phase in a continuous translucent phase of water soluble solids and produce a plurality of minute film ruptures, without breaking the continuity of said film.

4. The method of producing a sacchariferous dehydrated puree containing a relatively high percentage of water soluble carbohydrates and water insoluble food solids which comprises concentrating said puree to a moisture content not greater than 15% on a heated film-forming surface, stripping the concentrated puree from said surface as a continuous film wherein the food solids are suspended in a sacchariferous molten carrier, and stretching said stripped film under tension at least in its initial stages of elongation and while it is in a hot molten state to produce minute surface and film failures therein and distribute water insoluble solids randomly, thinly and discretely as a discontinuous phase in a continuous phase of water soluble solids, without breaking the continuity of said film.

5. The method of producing a dehydrated puree having improved rehydration properties which comprises concentrating a fruit puree containing finely divided food solids and sacchariferous material to a hot stretchable condition at a moisture level not greater than 15%, forming a film of said concentrated puree wherein the food solids are suspended in a sacchariferous molten carrier, said film having a thickness less than 0.050 and more than 0.005 inch, stretching said film under atmospheric conditions and to an extent sufficient to result in a plurality of minute ruptures on the surface of the film and distribute water insoluble solids randomly, thinly and discretely as a discontinuous phase in a continuous phase of water soluble solids, without breaking the continuity of said film.

6. The method of producing a dehydrated puree having improved rehydration properties which comprises concentrating a fruit puree containing finely divided food solids content and sacchariferous material to a hot stretchable condition at a moisture level not greater than 15%, forming a film of said concentrated puree wherein the food solids are suspended in a sacchariferous molten carrier, said film having a thickness less than 0.050 and more than 0.005 inch, and stretching said film in its hot molten state under normal atmospheric conditions and under sufficient tension to elongate the film but not to break it and result in a plurality of minute ruptures and puffs on the surface of the film and distribute water insoluble solids randomly, thinly and discretely as a discontinuous phase in a continuous phase of water soluble solids.

7. The method of producing a dehydrated puree having improved rehydration properties which comprises concentrating a fruit puree containing finely divided food solids and sacchariferous material to a hot stretchable condition at moisture level not greater than 15%, forming a film of said concentrated puree wherein the food solids are suspended in a sacchariferous molten carrier, said film having a thickness less than 0.050 and more than 0.005 inch, and stretching said film under normal atmospheric conditions and under sufficient tension to elongate the film but not to break it and result in a plurality of minute ruptures on the surface of the film and distribute water insoluble solids randomly, thinly and discretely as a discontinuous phase in a continuous phase of water soluble solids, and applying a dehumidified atmosphere to the stretched film to further reduce the moisture content thereof for subsequent flaking.

8. The method of producing a dehydrated puree having improved rehydration properties which comprises concentrating a puree containing water soluble carbohydrates and water insoluble food solids on a heated film-forming surface to a solids content of at least 85%, and stripping the concentrated puree from said surface as a continuous film wherein the food solids are suspended in a sacchariferous molten carrier, said stripped film having a thickness less than 0.050 and more than 0.005 inch, said film being stripped by applying tension thereto substantially in excess of that required to prevent product agglomeration at the point of its removal from the film forming surface and sufficient to stretch said film to substantially elongate but not to break the same and distribute water insoluble solids randomly, thinly and discretely as a discontinuous phase in a continuous translucent phase of water soluble solids.

9. The method of producing a dehydrated puree having improved rehydration properties which comprises concentrating a puree containing water soluble carbohydrates and water insoluble food solids on a heated film-forming surface to a solids content of at least 85%, stripping the concentrated puree from said surface as a continuous film, continuously stretching said film under tension to substantially elongate but not to break the same and distribute water insoluble solids randomly, thinly and discretely as a discontinuous phase in a continuous translucent phase of water soluble solids, and cooling the film to a friable condition.

10. The method of producing a dehydrated puree flake having improved rehydration properties which comprises stretching, under uniform tension but limited to avoid breaking, a continuous film of puree containing water soluble carbohydrates and water insoluble food solids which has been concentrated to a hot stretchable condition of at least 85% solids, the film being elongated to an extent sufficient to randomly, thinly and discretely disperse water insoluble solids in a sacchariferous continuous translucent phase of water soluble solids, feeding said stretched film to a zone of dehumidified air to thereby prevent moisture pick-up by the stretched film until it is in a condition suitable for flaking, circulating air which has been exposed to said stretched film to a zone whereat said air is dehumidified and it is reconditioned to absorb additional quantities of moisture from subsequently produced stretched portions of said film, recirculating said reconditioned air to said subsequently produced stretched portions, and breaking the thus treated stretched film into flakes for subsequent use.

11. The method of producing a dehydrated puree having improved rehydration properties which comprises concentrating a puree containing water soluble carbohydrates and water insoluble food solids on a heated film forming surface to a moisture content not greater than 15% and viscous plastic condition, continuously stripping said concentrated puree from said surface as a continuous film, and stretching said stripped film by applying tension uniformly thereto without breaking the continuity of said film or compressing the stretched film to a densified condition, whereby water insoluble food solids are distributed randomly, thinly and discretely as a discontinuous phase in a continuous phase of water soluble solids.

12. A method according to claim 11 wherein the puree is fruit puree.

13. A method according to claim 12 wherein the puree is apple puree.

14. A method according to claim 12 wherein the puree is peach puree.

15. A method according to claim 12 wherein the puree is pear puree.

16. A method according to claim 12 wherein the puree is apricot puree.

17. A method according to claim 11 wherein a thickening agent is incorporated in the puree.

18. The method of producing a dehydrated puree having improved rehydration properties which comprises concentrating puree fed to the pinch between a pair of oppositely rotating heated film forming drums to a total solids concentration of at least 85%, the pinch between said surfaces ranging between about 0.006 inch to 0.015 inch at its narrowest point, stripping said concentrated puree from said film forming surface as a continuous film having a thickness of 0.040 inch to 0.050 inch while in a hot molten condition, and stretching the stripped film to a thickness of about 0.015 inch to 0.020 inch whereby water insoluble food solids are randomly, thinly and discretely dispersed as a discontinuous phase in a continuous phase of water soluble solids.

19. A method according to claim 18 wherein the puree is apple puree.

20. A method according to claim 18 wherein the stretched film of puree is cooled to a temperature of substantially below 70° F. and broken into flakes.

21. A method according to claim 20 wherein the film is broken into flakes in the presence of dehumidified air at a temperature less than 30° F.

22. The product produced in accordance with the process of claim 1.

References Cited in the file of this patent

UNITED STATES PATENTS

| | | |
|---|---|---|
| 2,155,453 | Sturtz | Apr. 25, 1939 |
| 2,435,842 | Northcutt et al. | Feb. 10, 1948 |
| 2,846,319 | Kelly | Aug. 5, 1958 |